United States Patent Office.

EDWIN E. BURNETT, OF TUFNELL PARK, COUNTY OF MIDDLESEX, ENGLAND.

REMEDY FOR RHEUMATISM.

SPECIFICATION forming part of Letters Patent No. 366,149, dated July 5, 1887.

Application filed May 7, 1886. Serial No. 201,438. (No specimens.)

*To all whom it may concern:*

Be it known that I, EDWIN EBENEZER BURNETT, a subject of the Queen of Great Britain, residing at No. 118 Huddleston Road, Tufnell Park, Middlesex county, England, scientific chemist, have invented a new and useful Medical Compound, of which the following is a specification.

This invention relates to a medical compound designed for affording immediate relief to persons suffering from rheumatism, gout, and other analogous complaints.

The said compound is prepared as follows: I dissolve one pound of gum-guaiacum in one-half gallon of rectified spirits of wine. I also mix eight or ten ounces of Peruvian balsam with one-half gallon of said wine, and I dissolve about six ounces of aloes in one and a half pints of said spirits of wine. These three solutions are allowed to stand for about two days, when I strain the gum solution and then mix the three solutions together and add thereto a mixture constituted as follows: Three ounces of tincture of saffron, five ounces of laudanum, three ounces oil of sassafras, four ounces of sweet spirits of niter, and two ounces of chloric ether. When these ingredients have been well mixed, I add from one to two pints of distilled water, and flavor with a suitable essence. The sweet spirits of nitre causes an oxidation of the gum-guaiacum, which while in that state amalgamates with the Peruvian balsam, temporarily turning the liquid to a dark-greenish color, which in about half an hour is turned to a bright red, thus indicating that the oxidation is complete. The oil of sassafras is added to make up for the deficiency which the niter has sustained in the loss of part of its nitrous acid. The sassafras has, with the balsam and saffron, a healing power, and it also gives a strong secretory power to the respiratory organs and sweat-glands and helps the action of the niter upon the kidneys and urinary organs. The tincture of aloes is added to neutralize the detrimental effect of the alcohol and balsam upon the liver. The laudanum is added as a narcotic. The chloric ether is added as an auxiliary to the laudanum and to strengthen the sassafras and niter.

A proper dose for an adult of this compound is about one tea-spoonful three times a day.

What I claim is—

A medical compound consisting of gum-guaiacum, Peruvian balsam, sweet spirits of wine, tincture of saffron, laudanum, oil of sassafras, sweet spirits of niter, and chloric ether, substantially in the proportions herein set forth.

E. E. BURNETT.

Witnesses:
   GEO. E. VAUGHAN,
      57 *Chancery Lane, London.*
   F. C. WEARING,
      33 *Sidmouth Street, London.*